United States Patent [19]

Takano et al.

[11] Patent Number: 4,515,257

[45] Date of Patent: May 7, 1985

[54] CONTROL SYSTEM FOR AN ELECTROMAGNETIC CLUTCH FOR AUTOMOBILES

[75] Inventors: Toshio Takano, Hamuramachi; Ryuzo Sakakiyama, Tokyo, both of Japan

[73] Assignee: Fuji Jukogyo Kabushiki Kaisha, Tokyo, Japan

[21] Appl. No.: 445,298

[22] Filed: Nov. 26, 1982

[30] Foreign Application Priority Data

Dec. 4, 1981 [JP] Japan ................... 56-195390

[51] Int. Cl.³ .................. B60K 41/02; F16D 27/00
[52] U.S. Cl. ................. 192/0.075; 192/0.096; 192/21.5
[58] Field of Search ........... 192/0.03, 0.07, 0.075, 192/0.076, 0.092, 0.096, 3.56, 21.5; 74/866

[56] References Cited

U.S. PATENT DOCUMENTS

| | | | |
|---|---|---|---|
| 3,903,759 | 9/1975 | Hashimoto | 74/866 |
| 4,072,220 | 2/1978 | Hamada | 192/0.075 |
| 4,393,964 | 7/1983 | Kemper | 192/0.076 |
| 4,425,992 | 1/1984 | Makita | 192/0.076 |
| 4,449,620 | 5/1984 | Sakakiyama | 192/0.092 |

FOREIGN PATENT DOCUMENTS

| | | | |
|---|---|---|---|
| 2609213 | 9/1977 | Fed. Rep. of Germany | 192/0.075 |
| 0076224 | 6/1980 | Japan | 192/0.096 |
| 0123526 | 9/1980 | Japan | 74/866 |

*Primary Examiner*—George H. Krizmanich
*Attorney, Agent, or Firm*—Martin A. Farber

[57] ABSTRACT

A control system for a belt-drive continuously variable transmission. The transmission is connected to a crankshaft of an engine through an electromagnetic powder clutch. The control system has a vacuum switch which is closed by rapid release of an accelerator pedal for producing engine braking effect, a gate circuit including a NOR gate, and an astable multivibrator. The NOR gate is opened for a short time decided by a time constant circuit, and the multivibrator supplies pulses through the NOR gate to a switching transistor provided in a circuit of the electromagnetic clutch for periodically opening the transistor during the opening of the NOR gate. Thus, the electromagnetic clutch is intermittently engaged for providing partial engagement of the clutch for the short time.

18 Claims, 7 Drawing Figures

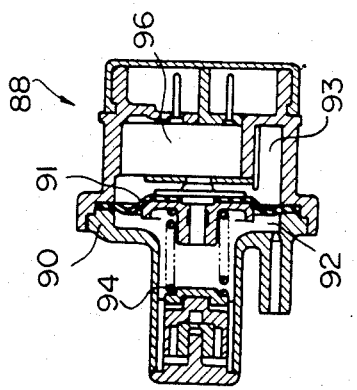
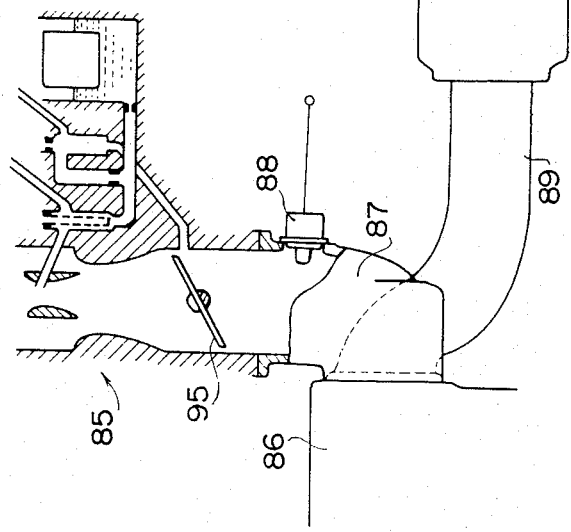
FIG. 4
FIG. 3

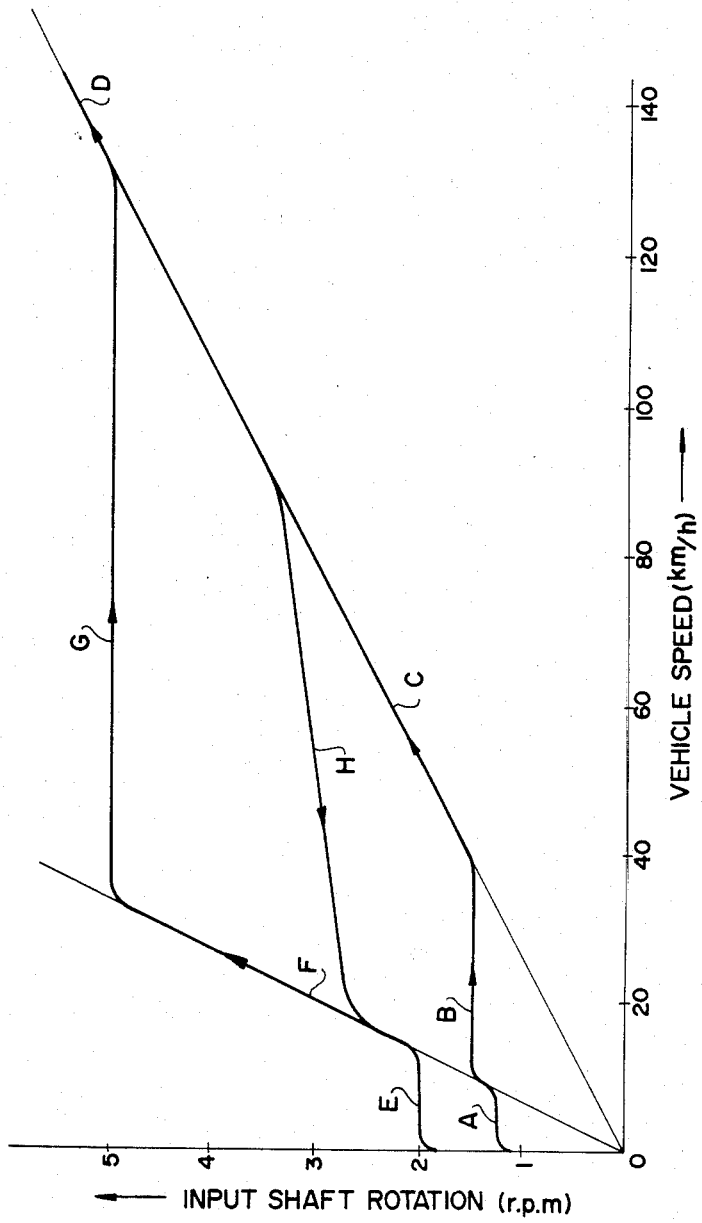

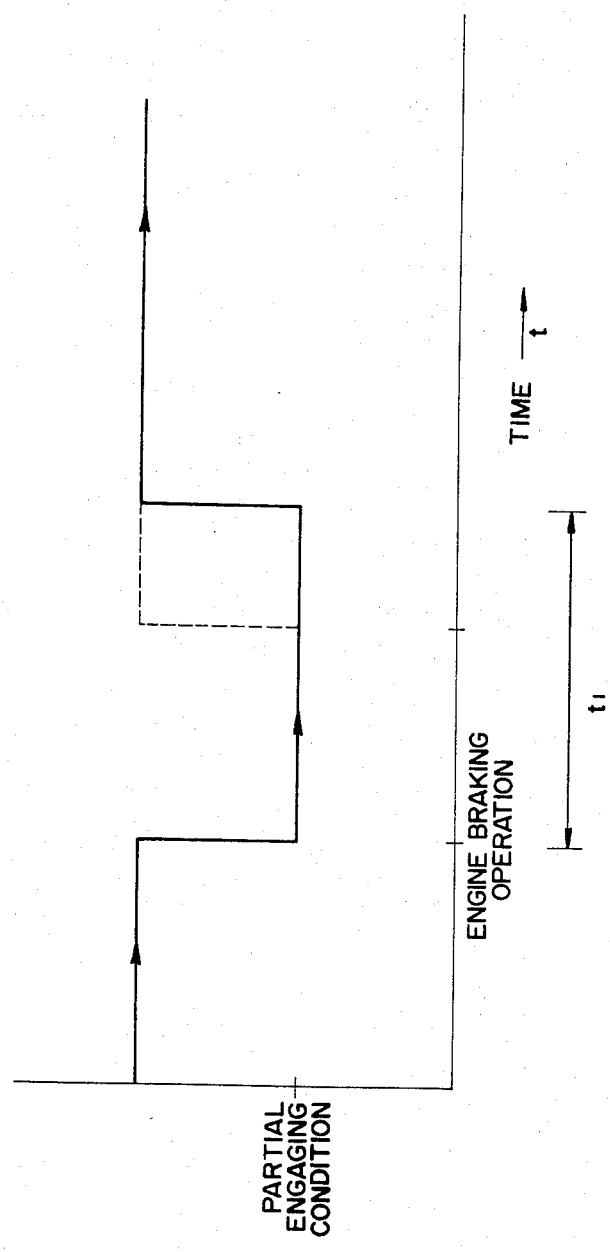

4,515,257

CONTROL SYSTEM FOR AN ELECTROMAGNETIC CLUTCH FOR AUTOMOBILES

BACKGROUND OF THE INVENTION

The present invention relates to a control system for an automatic transmission for automobiles, and more particularly to an automatic transmission by means of a belt drive device which is adapted to vary the transmission ratio continuously.

In a conventional belt-drive automatic transmission, which is called a continuously variable transmission, a centrifugal clutch is provided between a crankshaft of an internal combustion engine and an input shaft of the automatic transmission. The centrifugal clutch engages when the engine speed exceeds a predetermined value to transmit the output of the engine to the input shaft of the automatic transmission. On the other hand, the transmission ratio of the transmission changes with an increase of the engine speed and in accordance with load on the engine.

During the driving of a vehicle provided with such a belt-drive automatic transmission, when the vehicle is decelerated by releasing the accelerator pedal, the transmission ratio is increased to meet the decrease of vehicle speed. However, if the accelerator pedal is rapidly released for producing the engine braking effect, a large shock will arise in the power transmission system connected by the centrifugal clutch, since the transmission ratio increases suddenly. Such a shock gives an uncomfortable feeling to passengers.

SUMMARY OF THE INVENTION

The object of the present invention is to provide a control system for a transmission system provided with a continuously variable transmission for a vehicle which can prevent the producing of shock in the transmission system during rapid deceleration of the vehicle.

According to the present invention, there is provided a control system for an electromagnetic clutch for an automobile having a belt-drive automatic transmission for an engine having an accelerator pedal and a crankshaft, comprising a driving pulley, a driven pulley and a belt engaged with both said pulleys, the transmission ratio of which is automatically varied by changing effective diameters of both said pulleys, the improvement comprising an electromagnetic clutch having a coil for the engagement of the clutch and operatively connecting the crankshaft of said engine with an input shaft of said transmission, said electromagnetic clutch being engaged by exciting said coil with current for transmitting the output of said engine to the input shaft of said automatic transmission, rapid deceleration detecting means for producing an output signal when said engine is rapidly decelerated by rapid releasing of the accelerator pedal of said engine, gate circuit means for being actuated for a predetermined time period upon occurrence of said output signal of said detecting means, and circuit means for allowing the current to flow intermittently through said coil during the actuation of said gate circuit means.

The present invention will be more apparent from the following description made with reference to the accompanying drawings.

BRIEF DESCRIPTION OF DRAWINGS

FIG. 3 is a schematic illustration showing an induction and exhaust system of an engine for the automatic transmission;

FIG. 4 is a sectional view showing a vacuum switch;

FIG. 6 is a graph showing relationship between speed of an input shaft of the transmission and vehicle speed; and FIG. 7 is a graph showing a variation of clutch torque of an electromagnetic powder clutch employed in the system of the present invention.

DETAILED DESCRIPTION OF THE PREFERRED EMBODIMENT

Figure 1:
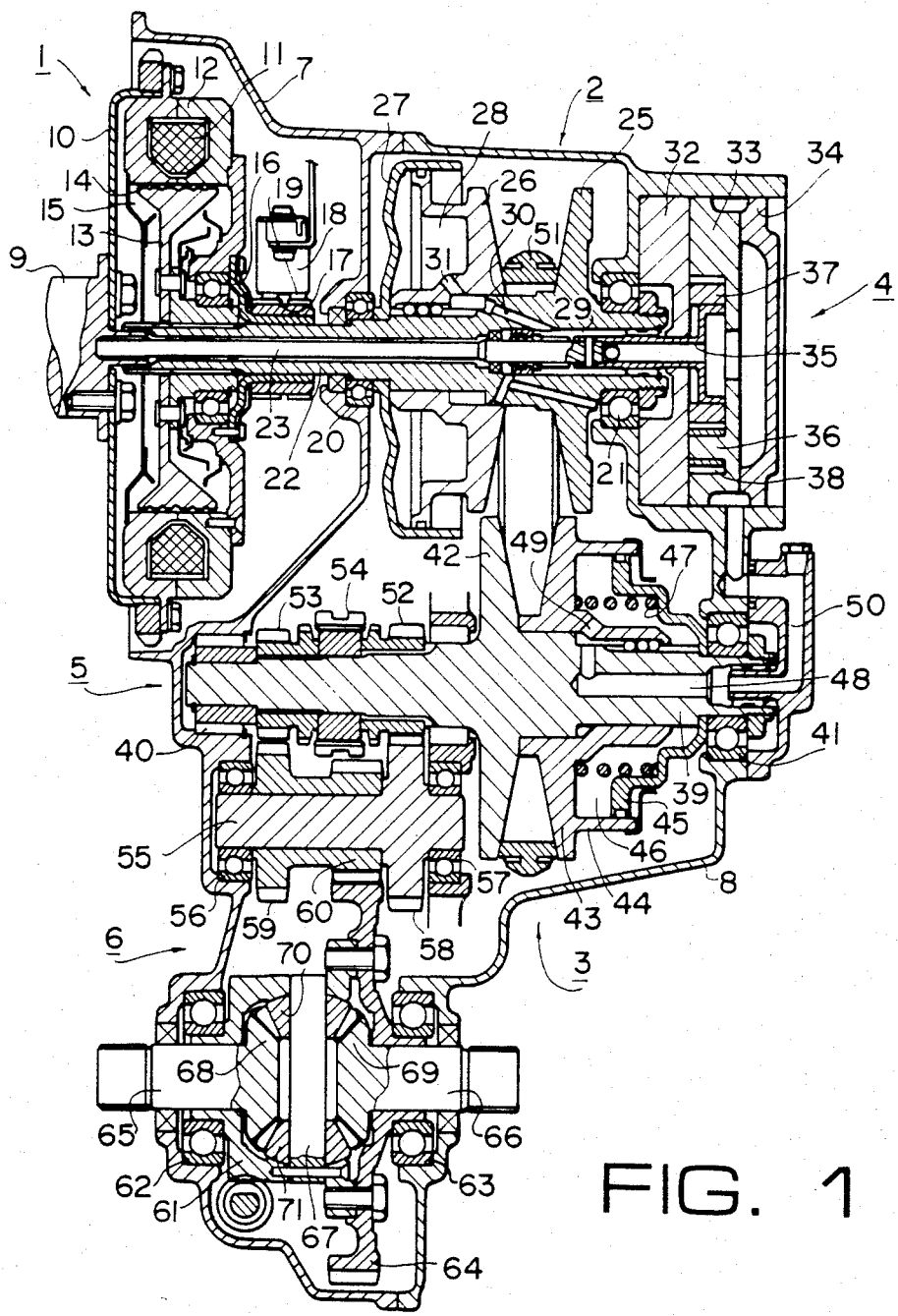
FIG. 1 is a sectional view showing a continuously variable belt drive automatic transmission which is employed in the system of the present invention.

Referring to FIG. 1, the automatic transmission comprises an electromagnetic powder clutch 1, driving pulley device 2, driven pulley device 3, oil pump device 4, rotation changing device 5 and differential 6. These portions are housed in a clutch case 7 secured to a cylinder block of an engine (not shown) and in a gear case 8 secured to the clutch case 7. A crankshaft 9 of the engine is connected to a drive plate 10 of the electromagnetic powder clutch 1. The electromagnetic powder clutch comprises a coil 11 provided in an annular drive member 12 secured to the drive plate 10, a driven member 13 with a gap 14 between the outer periphery thereof and the inner periphery of the drive member 12, and a powder chamber 15 defined by the drive member 12 and the driven member 13. The powder chamber 15 is filled with magnetic powder material. The driven member 13 is secured to an input shaft 22 of the automatic transmission. A sleeve 16 is secured to the drive member 12 and rotatably mounted on the input shaft 22, and slip rings 17 electrically connected to the coil 11 are mounted on the sleeve 16. The coil 11 is supplied with control current from a control circuit passing through brushes 18 supported on a holder 19 and engaged with slip rings 17.

The input shaft 22 is rotatably supported by bearings 20, 21 and has an axial hole in which an oil pump driving shaft 23 is mounted. The oil pump driving shaft 23 is connected to the crankshaft 9. A fixed conical disc 25 is formed on the input shaft 22 and a movable conical disc 26 is axially slidably mounted on the input shaft for forming a driving pulley. The movable conical disc 26 is also slidably mounted in a cylinder 27 secured to the input shaft 22 to form a cylinder chamber 28, so that the movable conical disc 26 acts as a piston sliding in the cylinder chamber. Passages 29 and 30 are formed in the input shaft and a passage 31 is formed in the movable conical disc 26 for communicating the cylinder chamber 28 with passages 30 and 29, which are communicated with a gear pump through a pressure oil control device (not shown). The gear pump is provided in three superimposed blocks 32, 33 and 34 and comprises gears 37, 38. A shaft 35 of a gear 37 is connected to the pump driving shaft 23 and the gear 38 is rotatably mounted on a shaft 36.

An output shaft 39 is disposed in parallel with the input shaft 22 and rotatably supported by bearings 40 and 41. A fixed conical disc 42 is formed on the output shaft 39 corresponding to the movable conical disc 26 and a movable conical disc 43 is slidably mounted on the shaft 39. The movable conical disc 43 has a cylindrical portion 44 in which a piston 45 secured to the output shaft 39 is slidably engaged. A spring 47 is provided in a cylinder chamber 46 between the movable conical disc 43 and the piston 45. An axial passage 48 is formed in the output shaft 39 and a passage 49 is formed in the movable conical disc 43 so as to communicate the cylinder chamber 46 with the passage 48. The passage 48 is communicated with the output of the gear pump through a passage 50. A drive belt 51 is engaged with the driving pulley comprising conical discs 25 and 26 and with the driven pulley comprising conical discs 42 and 43.

On the output shaft 39, a drive gear 52 and a reverse gear 53 are rotatably mounted and a dog clutch 54 is axially slidably engaged with the output shaft 39. A countershaft 55 is disposed in parallel with the output shaft 39 and supported by bearings 56 and 57. The drive gear 52 engages a counter gear 58 formed on the countershaft 55 and the reverse gear 53 engages with a countershaft reverse gear 59 through a reverse idler gear (not shown). An output gear 60 secured to the countershaft 55 engages with a ring gear 64 secured to a case 61 of the differential 6. The differential case 61 is supported by bearings 62 and 63. The differential 6 comprises a pair of axles 65, 66 having differential side gears 68, 69, a shaft 67 and pinions 70, 71.

Figure 2:
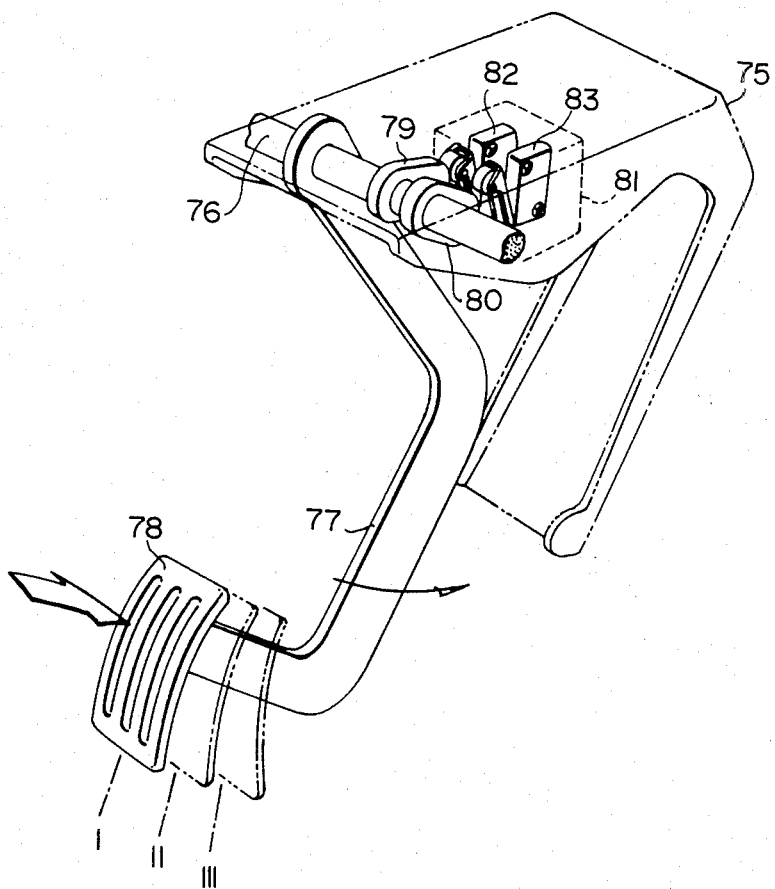
FIG. 2 is a perspective view showing an accelerator pedal.

Referring to FIG. 2, an arm 77 of an accelerator pedal 78 is secured to a shaft 76 rotatably supported by a bracket 75. A pair of cams 79, 80 are secured to the shaft 76 and an accelerator switch 82 and a kickdown switch 83 mounted in a box 81 operatively engage the cams 79, 80. A position I is an idling position where the accelerator pedal 78 is not depressed. When the accelerator pedal is slightly pushed down to a position II, the accelerator switch 82 is operated by the cam 79. When the accelerator pedal is depressed to a position III for kickdown, the kickdown switch 83 is operated by the cam 80.

Referring to FIG. 3, an engine 86 is provided with an induction passage 87, carburetor 85 and exhaust pipe 89. In order to detect deceleration of the engine, a vacuum switch 88 is provided in the induction passage 87. Referring to FIG. 4, the vacuum switch 88 comprises a cylinder 90 having a chamber which is divided into a vacuum chamber 92 and a switch chamber 93 by a diaphragm 91. The vacuum chamber 92 is communicated with the induction passage 87 and the diaphragm 91 is biased by a spring 94 toward a microswitch 96 in the switch chamber 93. When the throttle valve 95 is closed for deceleration, vacuum in the induction passage increases, so that the diaphragm 91 is deflected against the spring, thereby closing the microswitch 96.

Figure 5:
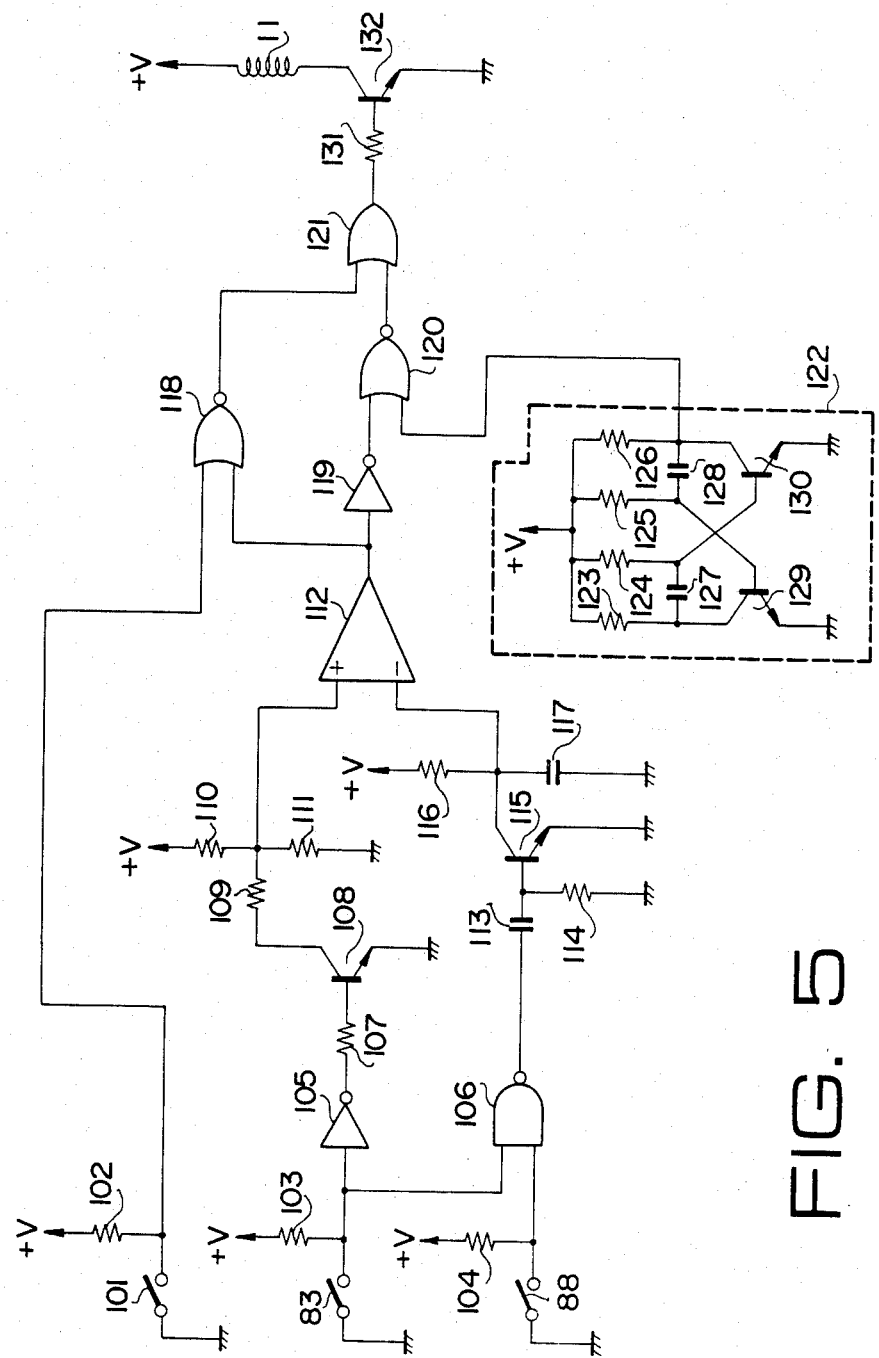
FIG. 5 is an electric circuit for a control system of the present invention.

A control circuit shown in FIG. 5 is provided with three input signal switches, that is a vehicle speed switch 101, kickdown switch 83 and vacuum switch 88. The vehicle speed switch 101 is closed when the vehicle speed exceeds a predetermined value and the vacuum switch 88 is closed by a high vacuum in the induction passage at deceleration. The vehicle switch 101 is electrically connected to one of the inputs of NOR gate 118 and the kickdown switch 83 is electrically connected to an invertor 105 and to one of the inputs of a NAND gate 106. The vacuum switch 88 is connected to the other input of the NAND gate 106. The output of the invertor 105 is connected to a base of a transistor 108 through a resistor 107, and the output of the NAND gate 106 is connected to a base of a transistor 115 through a differentiating circuit comprising a capacitor 113 and resistor 114. The collector of the transistor 108 is connected to a positive input of a comparator 112 through a resistor 109, and the collector of the transistor 115 is connected to a negative input of the comparator 112. Under cutoff conditions of the transistors 108, 115, the positive input of the comparator 112 is applied with a voltage divided by resistors 110 and 111 and the negative input is applied with a voltage charged in a capacitor 117. Under such a condition, the comparator 112 is adapted to produce a low output. The output of the comparator 112 is applied to an input of the NOR gate 118 and to one of the inputs of a NOR gate 120 through an invertor 119. Outputs of both NOR gate 118, 120 are connected to an OR gate 121, the output of which is connected to a base of a transistor 132 through a resistor 131.

(1) Idling operation

In idling operation, since the accelerator pedal is not pushed down, the accelerator switch 82 is opened. Accordingly, a starting circuit (not shown) does not operate and a circuit of the coil 11 is opened, so that the electromagnetic clutch 1 is disengaged. Although the input shaft 22 does not rotate, the pump driving shaft 23 is rotated by the crankshaft 9, so that gear pump 4 is driven to produce pressure oil.

(2) Starting of the vehicle

When the accelerator pedal 78 is pushed down, the accelerator switch 82 is closed to operate the starting circuit. The switch current flowing through the coil 11 increases with an increase of engine speed by operation of the starting circuit, so that the electromagnetic powder clutch engages gradually for the smooth starting of the vehicle. The input shaft 22 starts to rotate by the engagement of the clutch and the rotation of the input shaft is transmitted to the output shaft 39 by the belt 51 at a transmission ratio decided by effective diameters of the driven pulley and the driven pulley. The output of the shaft 39 is transmitted to the ring gear 64 through gears 52, 58, 60 and further to axles 65, 66 through the differential 6 to start the vehicle.

Describing the operation of the belt-drive automatic transmission, dependent on the depression of the accelerator pedal, the pressure coil control device operates to control the supply of pressure oil to cylinder chambers 28 and 46. First, the pressure oil is supplied to the chamber 46 passing through passages 50, 48, 49, so that the movable conical disc 43 is moved to the left as viewed in FIG. 1 and hence the effective diameter for the belt 51 on the driven pulley comprising conical discs 42, 43 increases. Thus, a large transmission ratio is established in the belt-drive transmission. As engine speed increases, the pressure oil is supplied to the cylinder chamber 28 passing through passages 29, 30, 31, so that the movable conical disc 26 is shifted to the right. Thus, the effective diameter on the driving pulley comprising conical discs 25, 26 increases, thereby to decrease the transmission ratio to increase the speed of the output shaft 39.

FIG. 6 shows relationship between the input shaft speed and vehicle speed. When the accelerator pedal is slowly pushed down at light load, the input shaft speed varies as shown by a line A, B, C, D according to the increase of the vehicle speed. On the other hand, in heavy load conditions, the input shaft speed varies as the lines E, F, G, D.

Referring to FIG. 5, in normal driving conditions, the vehicle speed switch 101 is closed, kickdown switch 83 and vacuum switch 88 are opened, so that the NOR gate 118 is applied with a low voltage, and invertor 105 and NAND gate 106 are applied with high voltages, respectively. Thus, transistors 108 and 115 are OFF by low level outputs of invertor 105 and NAND gate 106, so that the output of the comparator 112 is at low level as described above. Accordingly, output of the NOR gate 118 is at a high level and output of the OR gate 121 is at a high level, so that the transistor 132 is ON. Thus, the circuit of the coil 11 is ON to engage the electromagnetic powder clutch.

(3) Rapid deceleration operation

When the accelerator pedal 78 is rapidly released to the idling position for producing engine braking effect, the transmission ratio at the belt-drive transmission is rapidly increased. At the same time, vacuum in the induction passage 87 becomes high, so that the vacuum switch 88 is closed. Line H in FIG. 6 shows a decrease of vehicle speed corresponding to the increase of the transmission ratio maintaining the input shaft speed substantially constant. In a conventional system, since the input shaft speed, that is engine speed cannot be maintained as the line H because of load on the engine, shock is produced in the power transmission system. In accordance with the present invention, engine speed can be maintained for preventing the shock as described hereinafter.

Referring to FIG. 5, by the closing of the vacuum switch 88, a low level voltage is applied to one of inputs of the NAND gate 106, so that output of the NAND gate goes to high a level. Accordingly, the transistor 115 conducts for a time dependent on the differentiation signal by the differentiation circuit comprising capacitor 113 and resistor 114. During the conductive state of the transistor 115, the capacitor 117 discharges, so that the input voltage at the negative input of the comparator 112 is at a low level. Therefore, the output of the comparator 112 goes to a high level, which causes the output of NOR gate 118 to go to a low level and the output of the inverter 119 to go to a low level. The other input of the NOR gate 120 is supplied with output pulses of an astable multivibrator 122, so that the NOR gate produces output pulses. The pulses are applied to the base of the transistor 132 through the OR gate 121 and resistor 131 cause the transistor 132 alternately to conduct. Thus, the coil 11 is periodically excited thereby to intermittently engage the electromagnetic powder clutch. Therefore, clutch torque is decreased to a small value, for example, to $\frac{1}{8}-\frac{1}{2}$ of the rated clutch torque. Accordingly, engine speed can be maintained substantially constant in dependency on the depression of the accelerator pedal and shock caused by decrease of vehicle speed is absorbed in the clutch in a partial engagement state.

When the capacitor 117 is charged and voltage at the negative input of the comparator 112 becomes higher than that of the positive input, the output of the comparator goes to a low level. Thus, the transistor 132 is continuously conducted, so that the clutch engages entirely. Accordingly, the vehicle can be driven at high transmission ratio with engine braking effect.

FIG. 7 shows variation of the clutch torque. The clutch is in partial engagement state during the period $t_1$ which is decided by the time constant by the resistor 116 and capacitor 117.

When the accelerator pedal is pushed down to the floorboard for producing effect to close the kickdown switch 83, the invertor 105 and NAND gate 106 are applied with low level voltage, so that outputs of both circuits go to high levels. Thus, transistors 108 and 115 conduct. By the conductive state of the transistor 108, input voltage at the positive input of the comparator 112 becomes lower than that of the closing of the vacuum switch 88. Therefore, a shorter time elapses until the low level input at the negative input of the comparator 112 reaches the voltage at the positive input. Dashed line in FIG. 7 shows the shorter period of the partial engagement condition of the clutch. Since the clutch is in a partial engagement state during the period, decrease of engine speed can be prevented.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A control system for a belt-drive automatic transmission for an engine of the type which comprises a driving pulley, a driven pulley and a belt engaged with both pulleys, transmission ratio of which is automatically varied by changing effective diameters of both said pulleys, comprising an electromagnetic clutch having a coil, said electromagnetic clutch being operatively connected between said engine and an input shaft of said automatic transmission, said electromagnetic clutch being engaged by exciting said coil for transmitting output of said engine to the input shaft of said automatic transmission, means comprising a switch for being operated when an accelerator pedal of said engine is rapidly released to an idling position, gate circuit means opened depended on operation of said switch for a predetermined time period, circuit means for allowing the current to flow periodically through said coil during the opening of said gate circuit means, and wherein said gate circuit means includes a time constant circuit for producing a signal to open a gate for a predetermined time period.

2. The control system according to claim 1, wherein said circuit means includes a transistor for switching the circuit of said coil, and an astable multivibrator for supplying pulses through said gate to said transistor for periodical opening thereof.

3. The control system according to claim 1, wherein said electromagnetic clutch is an electromagnetic powder clutch.

4. The control system according to claim 1, wherein said switch is a vacuum switch operated by high vacuum in an induction passage of said engine.

5. In a control system for an electromagnetic clutch for an automobile having a belt-drive automatic transmission for an engine having a crankshaft and an accelerator pedal, comprising a driving pulley operatively connected to an input shaft of the transmission, a driven pulley and a belt engaged with both said pulleys, the transmission ratio of the transmission being automatically varied by changing effective diameters of both said pulleys, the improvement comprising an electromagnetic clutch having a coil for the engagement of the clutch and operatively connecting the crankshaft of said engine with the input shaft of said transmission, said electromagnetic clutch being engaged by exciting said coil with current for transmitting the output of said engine to the input shaft of said automatic transmission, rapid deceleration detecting means for producing an output signal when said engine is rapidly decelerated by rapid releasing of the accelerator pedal of said engine, gate circuit means for being actuated for a predetermined time period upon occurrence of said output signal of said detecting means, and another circuit means for passing the current intermittently through said coil during the actuation of said gate circuit means.

6. The control system according to claim 5, wherein said gate circuit means includes a gate time constant circuit for producing a signal to open said gate for the predetermined time period.

7. The control system according to claim 6, wherein said another circuit means includes a switch comprising a transistor connected to the coil, and means comprising an astable multivibrator for supplying pulses through said gate to said transistor for periodically switching the latter.

8. The control system according to claim 5, wherein said electromagnetic clutch is an electromagnetic powder clutch.

9. The control system according to claim 5, wherein said detecting means includes a vacuum switch operated by high vacuum in an induction passage of said engine, said accelerator pedal being disposed in said induction passage.

10. The control system according to claim 6, wherein said time constant circuit comprises a differentiation circuit and a transistor, said differentiation circuit is connected between said rapid deceleration detecting means and said transistor.

11. The control system according to claim 10, wherein said differentiation circuit comprises a capacitor and a resistor.

12. In a control system for an electromagnetic clutch for an automobile having an automatic transmission for an engine having a crankshaft and an accelerator pedal, the improvement comprising an electromagnetic clutch having a coil for engagement of the clutch and operatively connecting the crankshaft of said engine with an input shaft of said transmission, said electromagnetic clutch being engaged by exciting said coil with current for transmitting output of said engine to the input shaft of said automatic transmission, rapid deceleration detecting means for producing an output signal when said engine is rapidly decelerated by rapidly releasing the accelerator pedal, gate circuit means for being actuated for a predetermined time period upon occurrence of said output signal of said detecting means, and circuit means for passing the current intermittently through said coil during the actuation of said gate circuit means.

13. The control system according to claim 12, wherein rapid deceleration detecting means produces said output signal only when said engine is rapidly decelerated by rapidly releasing the accelerator pedal.

14. The control system according to claim 6, wherein rapid deceleration detecting means produces said output signal only when said engine is rapidly decelerated by rapidly releasing the accelerator pedal.

15. The control system according to claim 12, further comprising circuit means for sending continuous current through said coil during normal driving conditions up to said rapidly releasing of the accelerator pedal and upon expiration of said predetermined period.

16. The control system according to claim 6, further comprising circuit means for sending continuous current through said coil during normal driving conditions up to said rapidly releasing of the accelerator pedal and upon expiration of said predetermined period.

17. In a control system for an electromagnetic clutch for an automobile having an automatic transmission for an engine having a crankshaft and an accelerator pedal, the improvement comprising an electromagnetic clutch having a coil for engagement of the clutch and operatively connecting the crankshaft of said engine with an input shaft of said transmission, said electromagnetic clutch being engaged by exciting said coil with current for transmitting output of said engine to the input shaft of said automatic transmission, rapid deceleration detecting means for detecting rapid deceleration of the engine, circuit means for passing the current intermittently through said coil for a predetermined time period starting from substantially the beginning of the detecting of the rapid deceleration of the engine by said rapid deceleration detecting means.

18. The control system according to claim 17, wherein said circuit means is for sending continuous current through said coil during normal driving conditions until said starting from substantially the beginning of the detecting of the rapid deceleration of the engine by said rapid deceleration detecting means and upon expiration of said predetermined time period respectively.

* * * * *